US009359779B2

(12) United States Patent
Borchardt (10) Patent No.: US 9,359,779 B2
(45) Date of Patent: Jun. 7, 2016

(54) SPACE SAVING ANCHOR POINT FOR A CONCRETE STRUCTURE (71) Applicant: Mark A. Borchardt, Seattle, WA (US)

(72) Inventor: Mark A. Borchardt, Seattle, WA (US)

(*) Notice: Subject to any disclaimer, the term of this patent is extended or adjusted under 35 U.S.C. 154(b) by 0 days.

(21) Appl. No.: 14/971,456

(22) Filed: Dec. 16, 2015

(65) Prior Publication Data
US 2016/0102469 A1 Apr. 14, 2016

Related U.S. Application Data (63) Continuation-in-part of application No. 14/554,620, filed on Nov. 26, 2014, which is a continuation-in-part of application No. 14/533,605, filed on Nov. 15, 2014, now Pat. No. 9,180,323.

(51) Int. Cl.
E04B 1/38 (2006.01)
E04C 5/00 (2006.01)
E04G 21/32 (2006.01)
A62B 35/00 (2006.01)
F16M 13/02 (2006.01)

(52) U.S. Cl.
CPC ........ E04G 21/3276 (2013.01); A62B 35/0068 (2013.01); F16M 13/02 (2013.01)

(58) Field of Classification Search
CPC .... A62B 35/0068; F16M 13/027; E04B 5/00; E04B 1/40; E04B 1/4178; E04B 1/38; E04B 2/30; E04B 1/4121; E04B 1/41; E04G 21/142; E04G 15/04; E04G 21/32; B66C 1/666; B28B 23/005
USPC .................... 52/698, 699, 700, 701, 703, 704
See application file for complete search history.

(56) References Cited

U.S. PATENT DOCUMENTS

| 1,037,142 | A | * | 8/1912 | Hazen | E04B 1/4135 52/698 |
| 1,244,034 | A | * | 10/1917 | Cummings | E04B 1/4142 52/706 |
| 1,285,202 | A | * | 11/1918 | Jaques | E04B 1/4121 248/343 |
| 3,078,621 | A | * | 2/1963 | Hinds | E04G 21/142 206/321 |
| 3,550,343 | A | * | 12/1970 | Buske | E04B 1/4142 410/112 |
| 3,821,338 | A | * | 6/1974 | Faust | E04G 15/061 248/524 |
| 3,873,147 | A | * | 3/1975 | Annable | B66C 1/666 294/89 |

(Continued)

Primary Examiner — Joshua J Michener
Assistant Examiner — Keith Minter
(74) Attorney, Agent, or Firm — Dean A Craine; Marisa Whitaker (57) ABSTRACT A space saving anchor point for a concrete deck or column. The anchor point includes an external rigid member that attaches to the elongated receiver box and becomes embedded into the concrete. The external rigid member may be a T-shaped bracket with an elongated main flange and two parallel side flanges or two L-shaped brackets each with a main flange and a perpendicularly aligned side flange. Formed between the two side flanges on the T-bracket is a center space that receives an elongated receiver box. The elongated box is a partially enclosed structure with a lower opening that communicates with an interior cavity. Extending between the side flanges and transversely through the interior cavity is a rod with its opposite ends that extend laterally from the sides of the side flanges and become covered with concrete. Attached to the portion of the rod located inside the elongated box's interior cavity is an elongated connector plate. The connector plate is assembled on the rod and is configured to rotate around the rod and move longitudinally inward inside the interior cavity to hidden position or moved outward from the interior cavity partially exposing the plates' second opening.

10 Claims, 11 Drawing Sheets

(56) References Cited

U.S. PATENT DOCUMENTS

| | | | | | |
|---|---|---|---|---|---|
| 4,173,856 | A | * | 11/1979 | Fricker | E04G 21/142 248/499 |
| 4,318,525 | A | * | 3/1982 | Welch | F16M 13/027 248/228.7 |
| 4,512,121 | A | * | 4/1985 | Carydias | E04G 21/142 52/125.2 |
| 4,702,045 | A | * | 10/1987 | Fricker | E04G 21/142 52/125.4 |
| 5,553,685 | A | * | 9/1996 | Cook | A62B 35/0068 182/3 |
| 5,625,993 | A | * | 5/1997 | Kelly | E04B 1/4107 52/506.05 |
| 5,666,768 | A | * | 9/1997 | Gavin | E02D 29/12 16/438 |
| 5,699,639 | A | * | 12/1997 | Fernandez | E04B 7/045 52/295 |
| 7,254,926 | B2 | * | 8/2007 | Eldeen | E04B 1/003 52/650.3 |
| 7,654,057 | B2 | * | 2/2010 | Zambelli | E04B 1/4107 411/82 |
| 2005/0257446 | A1 | * | 11/2005 | Wolner | A62B 35/0068 52/127.1 |
| 2006/0060439 | A1 | * | 3/2006 | Shirokoshi | F16M 11/10 188/382 |
| 2006/0242924 | A1 | * | 11/2006 | Kwon | E04B 1/415 52/704 |
| 2007/0039258 | A1 | * | 2/2007 | Walker | E04B 2/96 52/235 |
| 2008/0042029 | A1 | * | 2/2008 | Reeves | A63B 29/024 248/231.91 |
| 2011/0309041 | A1 | * | 12/2011 | Amadio | F16M 11/10 211/26 |
| 2013/0185906 | A1 | * | 7/2013 | Nichols, Jr. | A62B 35/0068 24/703.1 |
| 2014/0251724 | A1 | * | 9/2014 | Nichols, Jr. | A62B 35/0068 182/3 |
| 2015/0196785 | A1 | * | 7/2015 | Borchardt | A62B 35/0068 52/700 |
| 2015/0368919 | A1 | * | 12/2015 | Borchardt | E04B 1/415 52/706 |

* cited by examiner

SPACE SAVING ANCHOR POINT FOR A CONCRETE STRUCTURE

This is a continuation in part application of U.S. utility patent application Ser. No. 14/554,620 filed on Nov. 26, 2014 which is a continuation in part application based on U.S. utility patent application Ser. No. 14/309,372 filed on Jun. 19, 2014.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to apparatus, systems and methods for constructing fall prevention anchor points in a concrete ceiling.

2. Description of the Related Art

Many buildings have floors made of concrete slabs or decks manufactured by pouring wet concrete into wood forms. After the concrete has dried and cured, the wood forms are removed exposing the exterior surfaces of the concrete deck. When the bottom surface of the concrete deck acts as the ceiling for a lower floor, HVAC duct work, plumbing and electrical conduits, and insulation materials are sometimes attached to the bottom surface.

Federal, state and local regulations require workers use or wear fall restraining or fall arresting equipment when working at elevations greater than 6 feet above a floor or when working near the open leading edge of a building. Such equipment typically includes lanyards attached at one end to a harness or vest worn by the worker. The opposite end of the lanyard is attached to a rigid anchor point.

When working on the floor of a building with open leading edges, workers must wear fall arresting equipment at all times. Because the workers must move on the floor, the fall arresting equipment must allow the worker to move freely over the floor.

What is needed is an inexpensive, easy to install anchor point that attaches to a fall resistant lanyard worn by a worker that is embedded into a concrete structure. What is also needed is an anchor point that is partially exposed and readily visible to workers working nearby.

In some instances, the concrete structure is relatively small or contains interior structural rebar members or duct work that limit the size of the anchor point that can be installed in the concrete structure.

A compact, space saving anchor point that meets all of the above stated needs would be desirable.

SUMMARY OF THE INVENTION

A concrete anchor point is disclosed that includes a plate connector that drops down through a lower slot opening formed on a narrow, partially enclosed receiver box embedded into the bottom surface of a concrete deck that forms the ceiling for a lower floor in a building. The receiver box is oriented so the lower slot opening is flush with the bottom surface of the concrete deck and exposed when the form used to construct the concrete deck is removed.

The receiver box is a hollow, five-sided elongated box with two long walls, two end walls, and a top panel. Formed on the receiver box opposite the top panel is a rectangular slot opening that leads to a narrow, upward extending interior cavity formed inside the receiver box. Disposed around the slot opening and perpendicular aligned with the box's side walls and end walls is at least one laterally extending mounting surfaces. Formed on the mounting surface is at least one nail hole or slot.

During assembly, the receiver box is mounted with its slot opening facing downward against the inside surface of a planar wood form used to create the bottom surface of the concrete deck. The receiver box is also oriented so its mounting surface is positioned adjacent to the inside surface of the wood form. A nail or screw is inserted into the hole or slots to hold the receiver box in place on the wood form when wet concrete is poured over the wood form and around the receiver box. When the concrete is cured, the wood form is removed and the receiver box with a slot opening facing downward is embedded into the concrete deck. When the form is removed, the slot opening is exposed.

Formed on the receiver box's two opposite long walls are two rod openings configured to receive a rod extending transversely through the interior cavity formed in the receiver box. The ends of the rod extend laterally from the long side walls and become embedded in the concrete when the concrete deck is poured.

Connected to the portion of the rod that extends into the interior cavity is a thin connector plate. In one embodiment, the connector plate includes two holes formed on its opposite ends. During assembly, the connector plate is inserted into the interior cavity so the rod extends through one hole formed on the connector plate to permanently connect the connector plate to the rod. Because the two holes are on opposite ends of the connector plate, the connector plate freely rotates around the rod and the opposite ends extends downward from the slot opening after the wood form is removed. The lengths of the receiver box and the connector plate are sufficient so the connector plate is disposed inside the receiver box when the receiver box is attached to the inside surface of the wood form. When the wood form is removed, the connector plate automatically extends downward through the slot opening and is visible. A suitable snap hook or D-ring connector connected to a fall resistant lanyard or safety strap attached to a safety harness or vest worn by the worker. The lanyard or safety strap and harness or vests are fall resistant structures designed to prevent injuries from falls.

A third embodiment of the anchor point is a compact, space saving version that includes a rotating connector plate that selectively moves longitudinally inside a compact, narrow elongated receiver box. Like the previous embodiments, the connector plate is designed to fit entirely inside the receiver box when longitudinally aligned with the receiver box. The receiver box is aligned on the concrete structure so its longitudinal axis is perpendicular to the outside surface of the concrete structure. The first opening on the connector plate is oval thereby enabling the connector plate to slide longitudinally inside the receiver box and exposed the connector plate's second opening. Formed on each side wall on the elongated receiver box is a hole through which a connecting rod extends. During construction of the concrete structure the side walls of the receiver box and the exposed ends of the connecting rod are embedded in concrete. An optional lock washer may be attached to the connecting rod which hold the connecting rod in place on the elongated box. The receiver box may include optional flange surfaces on four opposite sides that enable the receiver box to be attached to the inside surface of a wood form used to construct the concrete structure. The flange surfaces can also act as depth guides for positioning the receiver box in the form.

In another embodiment, the anchor point includes a single T-shaped bracket or two L-shaped brackets that become embedded into the concrete to provide greater strength. The T-shaped brackets or L-shaped brackets positioned inside the form and attached to a short rod that extends transversely through the elongated box. The T-shaped bracket includes an elongated main flange and two parallel side flanges. The two L-shaped brackets each include s shorter main flange and a side flanges. Located between the two side flanges on the T-shaped bracket is a center space that receives an elongated receiver box perpendicularly aligned with the main flange. The elongated box is identical to the elongated box used in the other embodiment with a lower opening that communicates with an interior cavity. When the two L-shaped brackets are used, the L-shaped brackets are aligned on opposite sides of the elongated box with their main flanges longitudinally aligned.

Extending between the T-shaped brackets' two side flanges or extending between the two side flanges on the L-shaped brackets and transversely through the elongated box's interior cavity is a rod. The rod is sufficient in length so that its opposite ends that extend laterally from the sides of the side flanges and become covered with concrete. Attached to the portion of the rod located inside the elongated box's interior cavity is an elongated connector plate. The connector plate is assembled on the rod and is configured to rotate around the rod and move longitudinally inward inside the interior cavity to hidden position or moved outward from the interior cavity partially exposing the plates' second opening. The second opening may connect to a suitable snap hook or clip.

During assembly, the front edge of the elongated box is attached to the inside surface of the front frame member used to make the concrete column, wall or ceiling. The side flanges on the T-shaped brackets or the two L-shaped brackets are longitudinally aligned with the elongated box. The main flanges on the T-shaped brackets or L-shaped brackets are located deep inside the column, wall or ceiling form and become embedded in concrete.

In another method to use the anchor points, at least two anchor points are assembled on the bottom surface of a concrete deck and a cable attached at its opposite ends attaches at its opposite ends to the two connector plates. A suitable snap hook or D-ring connector configured to slide over the cable is attached to a fall resistant lanyard or safety strap connected to a worker that enables the worker to move over the floor and longitudinally under the cable.

DESCRIPTION OF THE PREFERRED EMBODIMENT(S)

A fall protection tie-off anchor point 8 created on a concrete deck 10 that includes a receiver box 20 oriented so the lower slot opening 38 is flush with the bottom surface 11 of a finished concrete deck 10, which acts as a ceiling for a floor located below the deck 10, and exposed when the form 90 used to construct the concrete deck 10 is removed.

Figure 1:
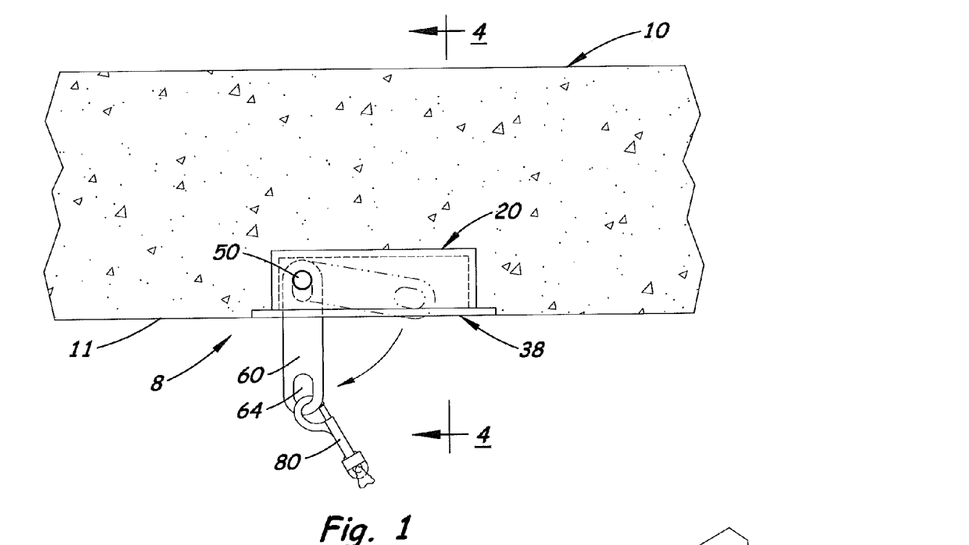
FIG. 1 is a sectional front elevational view of a section of a concrete deck with the tie off anchor point embedded into the ceiling of the concrete deck and showing the connector plate rotated downward so its lower end extends through the slot opening and act as an anchor point for a safety strap
Figure 2:
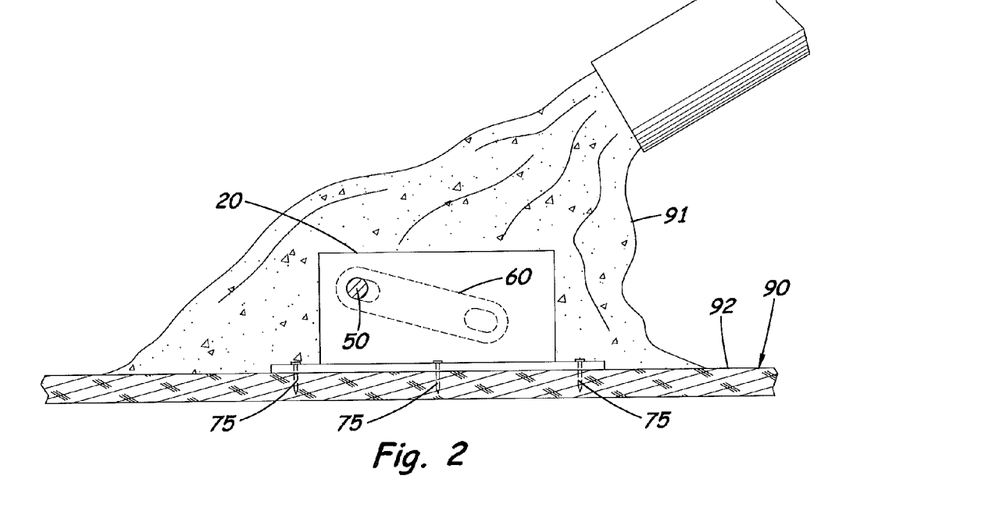
FIG. 2 is an illustration showing the point assembled on the form used to construct a concrete deck.
Figures 3, 4, 5:
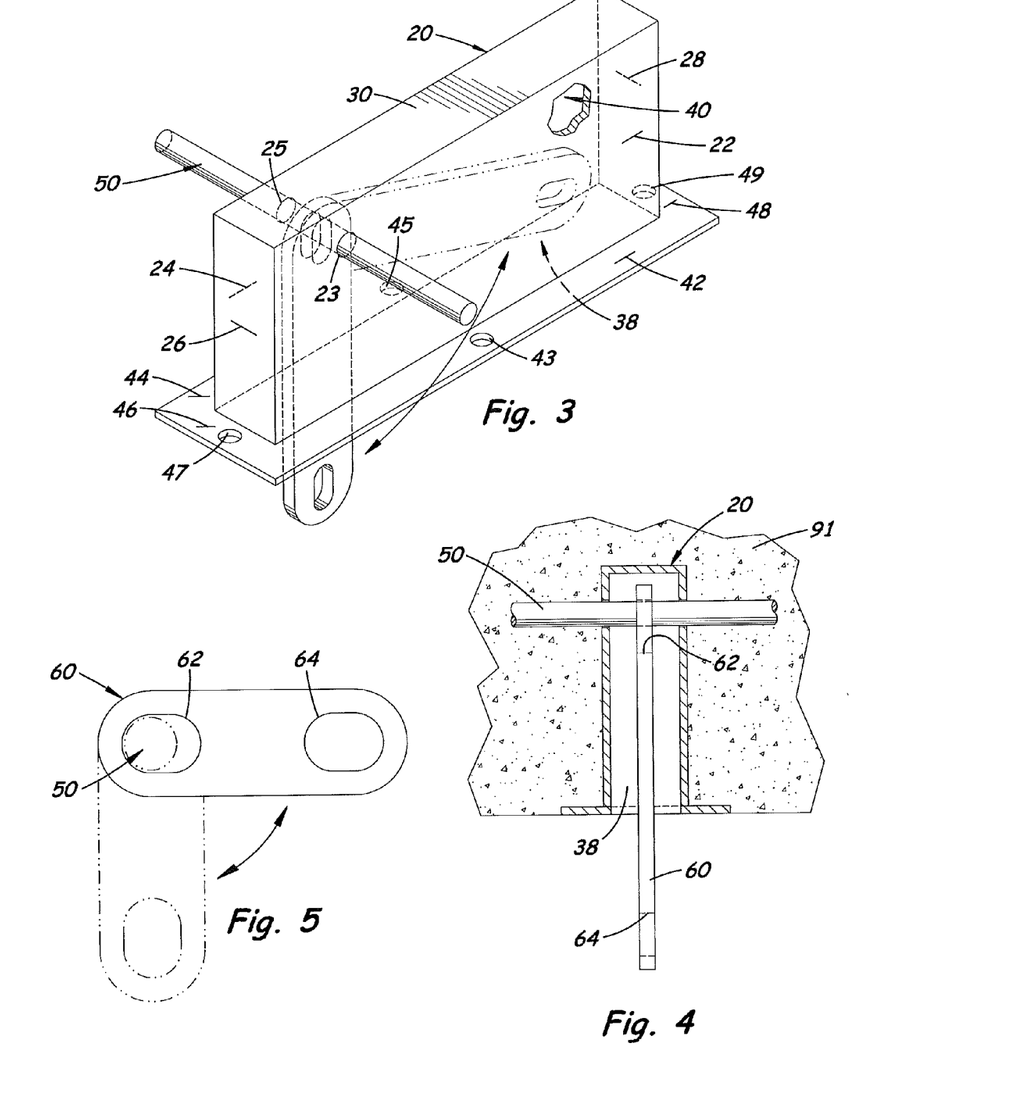
FIG. 3 is a perspective view of the anchor point.
FIG. 4 is a sectional, end elevational view the anchor point embedded in a concrete deck taken along line 4-4 in FIG. 1.
FIG. 5 is a side elevational view of the connector plate.

As shown in FIGS. 3 and 4, the receiver box 20 is a hollow, five-sided elongated box with two long walls 22, 24, two end walls 26, 28, and a top panel 30. Formed on the receiver box 20 opposite the top panel 30 is a rectangular slot opening 38 that leads to a narrow interior cavity 40. Disposed around the slot opening 38 and perpendicular aligned with the box's side walls 22, 24 and end walls 26, 28 are four laterally extending mounting flange surfaces 42, 44, 46, and 48, respectively. Formed on each flange surface 42, 44, 46, and 48 is at least one nail hole 43, 45, 47, and 49, respectively. During assembly, a suitable nails 78 are inserted through the holes 43, 45, 47, and 49 to attach the receiver box 20 to the inside surface 92 of the form 90.

Formed on the receiver box's two opposite long walls 22, 24 are two rod openings 23, 25 configured to receive a rod 50 extending transversely through the inner cavity 40 formed in the receiver box 12. The ends of the rods 50 extend laterally and are embedded in the concrete 91 as shown in FIG. 4.

The anchor point 8 also includes a connector plate 60 that connects to the portion of the rod 50 that extends into the inner cavity 40. In one embodiment, the connector plate 60 is a flat, elongated plate with two elongated, oval-shaped holes 62, 64 formed on its opposite ends. During assembly, the connector plate 60 is inserted into the inner cavity 40 so the rod 50 extends through the top hole 62 to connect the connector plate 60 to the rod 50. The connector plate 60 can rotate freely around the rod 50 and is sufficient in length so the opposite end of the connector plate 60 extends through the slot opening 38 when the receiver box 20 when the wood form 90 is removed. When the form 90 is removed, the connector plate 60 automatically rotates so the lower elongated hole 64 on the connector plate 60 is exposed. A worker may connect to a suitable D-ring connector 80 to the lower hole 64 when working on or under the ceiling.

Figure 6:
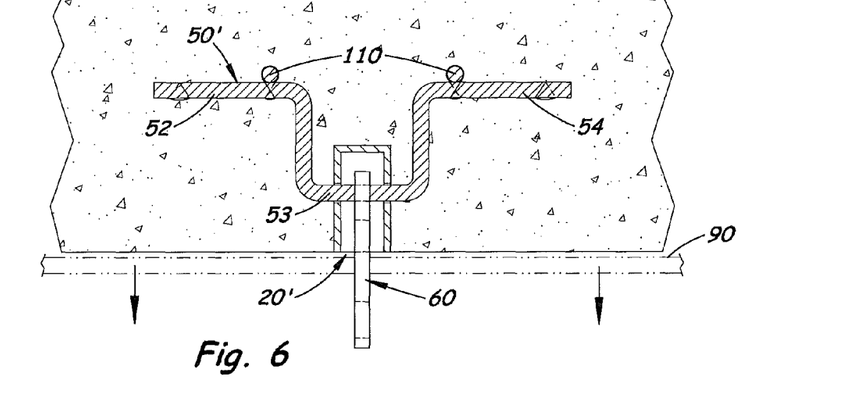
FIG. 6 is a second embodiment of the anchor point that uses a U-shaped rod.

FIG. 6 is a second embodiment of the anchor point that uses a U-shaped rod 50' in place of a straight rod 50. The rod 50' includes two upper arm sections 52, 54 that extend upward from the receiver box 20' and attach to the structural rebar members 110 assembled in the deck above the receiver box 20'. The receiver box 20' is identical to the receiver box 20 accept for the absence of flange members. During assembly, the receiver box 20' is positioned over the wood form and the two upper arm sections 52, 54 are then tied to the rebar members 110 to hold the receiver box 20' in place.

In the embodiment shown in the Figs., the receiver box 20, 20' measures approximately 8 inches is length, 3 inches in height, and ¾ inches in width. The side walls, end walls and top panel are made of plastic approximately ⅛ inches thick. The two rod openings 23, 25 are approximately 11/16 inches in diameter and the rod 50 is approximately ¼ inch in diameter and 8 to 16 inches in length. On receiver box 20, the mounting surfaces 42, 44, 46, and 48, includes at least one nail or screw hole 43, 45, 47, and 49, respectively, that measure approximately ¼ inches in diameter. It should be understood that receiver box 20, 20' may include one or more mounting surfaces 42, 44, 46, and 48.

The connector plate 60 is a flat thin metal or other composite material meeting the OSHA 5000 lb to 10,000 lb. requirement for anchorage points and varies in length depending on the required structural thickness of the concrete deck 10 it is being installed in. The connector plate 60 measures approximately 7 to 9 inches in length, 2 inches in width and ¼ inch thick. The elongated holes 62 and 64 measure approximately 1¾ inches in length, and 1¼ inches in width.

As stated above, the rod 50 and connector plate 60 are assembled on the receiver box 20. The connector plate 60 is then rotated inside the interior cavity 40 and the mounting surfaces 42, 44, 46, and 48 are then positioned at a desired location over the inside surface 92 of the form 90. Nails 75 are then inserted into the nail holes 43, 45, 47, and 49 to hold the receiver box 20 on the form 90. Wet concrete 91 is then poured over the form 90 and over the receiver box 20 and the exposed ends of the rod 50. After the concrete 91 has cured, the form 90 is then removed thereby exposing the slot opening 38 and the connection plate 60. Gravity causes the connector plate 60 to rotate around the rod 50 so the lower elongated hole 64 is exposed and may be accessed by a worker.

Figure 7:
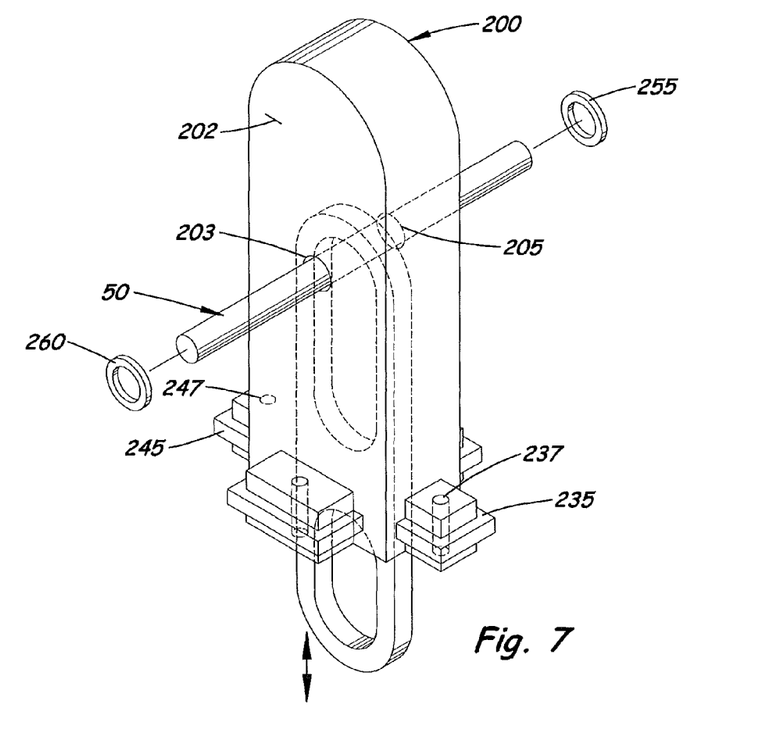
FIG. 7 is a third embodiment of the anchor point that uses a narrow elongated box with an interior cavity that is perpendicularly aligned with the box's open mounting surface in which a transversely aligned rod that engages a thin connector plate that selectively moves from a hidden, inward position to an outward exposed position from the interior cavity when needed.

FIG. 7 is a third embodiment of the anchor point 8 that includes a rotating connector plate 60 that selectively moves longitudinally inside a narrow elongated receiver box 200. During use, the connector plate 60 can slide longitudinally and fit entire into the elongated receiver box 200 or it may slide longitudinally from the elongated receiver box 200 and expose the second opening 64 formed on the connector plate 60

The receiver box 200 includes two parallel large side walls 202, 204, two parallel small side walls 206, 208, a curved end wall 210, and an end opening 220. Formed inside the elongated box 200 is an interior cavity 230 that is perpendicularly aligned with the box's open end surface 220. Formed on each side wall 202, 204 is a hole 203, 205 through which a connecting rod 50 extends. Optional lock rings 250, 255 may be attached to the connecting rod 50 which hold the connecting rod 50 in place on the elongated receiver box 200.

Figures 8, 9:
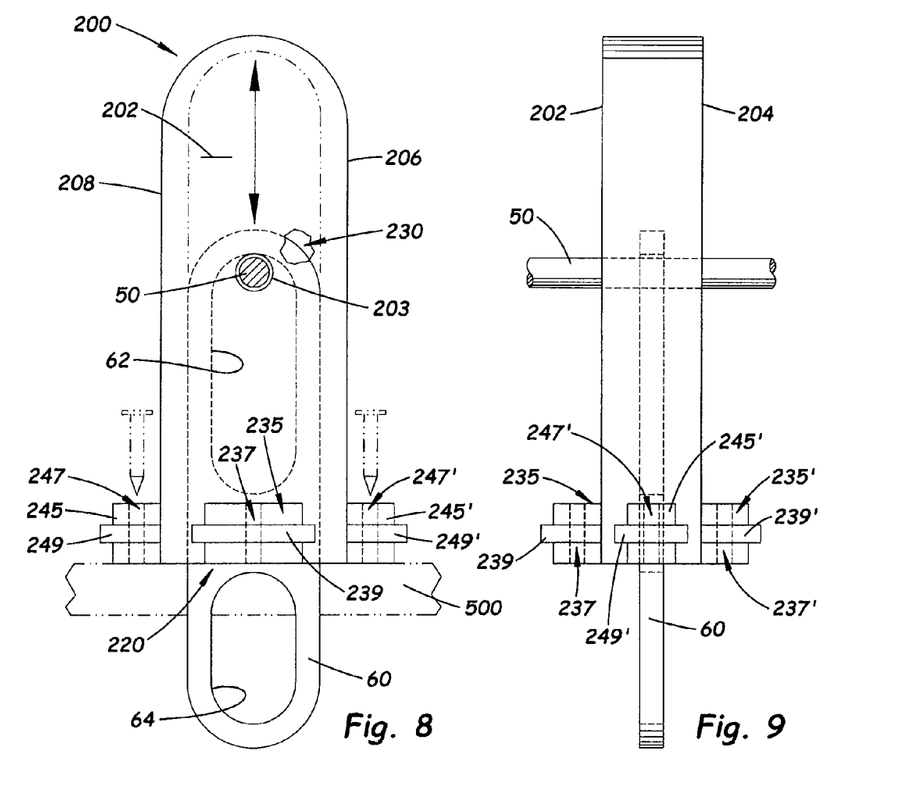
FIG. 8 is a side elevational view of the anchor point shown in FIG. 7.
FIG. 9 is a front elevational view of the anchor point shown in FIGS. 7 and 8.
Figure 10:
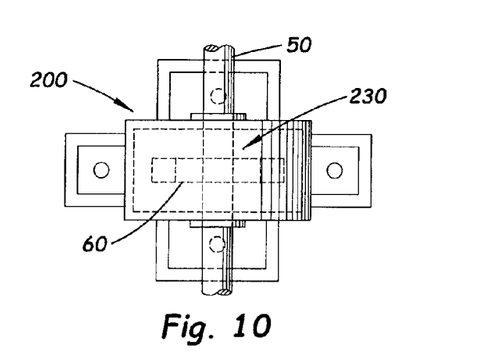
FIG. 10 is a top plan view of the anchor point shown in FIGS. 7-9.

Mounted on the lower end of the elongated box near the end opening 220 on opposite side surfaces 202, 204 are four mounting flange surfaces 235, 235', 245 and 245' each with a hole 237, 237', 247, and 247', respectively, formed therein configured to receive a suitable connector (screw or nail) to attach the elongated receiver box 200 to the inside surface of a wood form 500 (see FIG. 8). Each flange surface 235, 235', 245 and 245' may include an optional lip 239, 239', 249, and 249', respectively, that extends laterally from the adjacent edge. The flange surfaces 235, 235', 245, and 245' may be used as attachment points for attaching the elongated receiver box 20 to rebar members located adjacent to the elongated receiver box 20. They may also be used as a fence or depth gauge for a form.

With this embodiment, the connector plate 60 must fit longitudinally inside the elongated receiver box 200 and, when desired, partially extend through the end opening 220. During use, the connector plate 60 may be rotated 15 to 45 degrees over the connecting rod 50. The upper hole 62 on the connecting plate 60 is oval and is sufficient in length and is located from the upper end of the connector plate 60 so that the connecting plate 50 may be forced inward to hide the connector plate 60 inside the interior cavity 230 so that an optional cover 300 (see FIG. 13) may be placed over and attached to the two flange surfaces. The cover 300 may be removed from the elongated receiver box 200 to access the connector plate 60 and pull it outward to expose the second hole 64.

Figure 11:
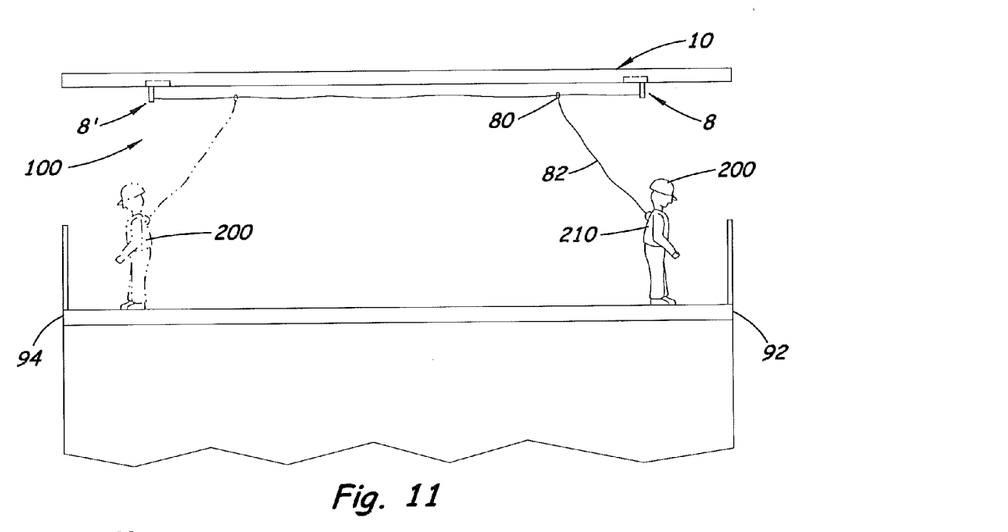
FIG. 11 is an illustration of an anchor point that includes at least two anchor points mounted on the ceiling and showing a worker on the floor of a building near the two leading edges attached to one end of a fall resistant lanyard that attaches at a higher end to cable that extends between the two anchor points.

In the third embodiment, the receiver box 200 measures approximately 7-34/inches in length, 2½ inches in width and 1¼ inches in depth. The flanges are FIG. 11 is an illustration of an anchor point 100 that includes at least two anchor points 8, 8' mounted on the ceiling and showing a worker 200 wearing a safety harness 202 attached to the lower end of a fall resistant lanyard 82 and working on the floor 92 of a building 90 near the two leading edges 94, 96. The upper end of the lanyard 82 is attached to a slide connector 80 that configured to slide freely over the cable 100.

Figure 12:
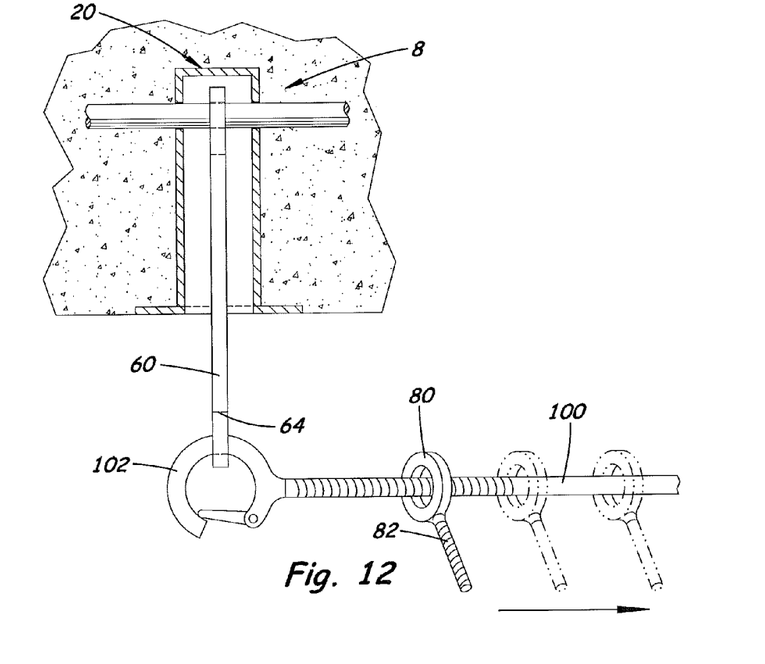
FIG. 12 is an illustration showing the connector plate extended from the receiver box and with the connector attached cable that extends laterally and showing a connector attached to a fall resistant lanyard and sliding over the cable.

FIG. 12 is an illustration showing in greater detail the connector plate 60 extended from the receiver box 20 and with the connector 102 attached cable 100 that extends laterally and showing a connector 80 attached to a fall resistant lanyard 82 and sliding over the cable 100

Figure 13:
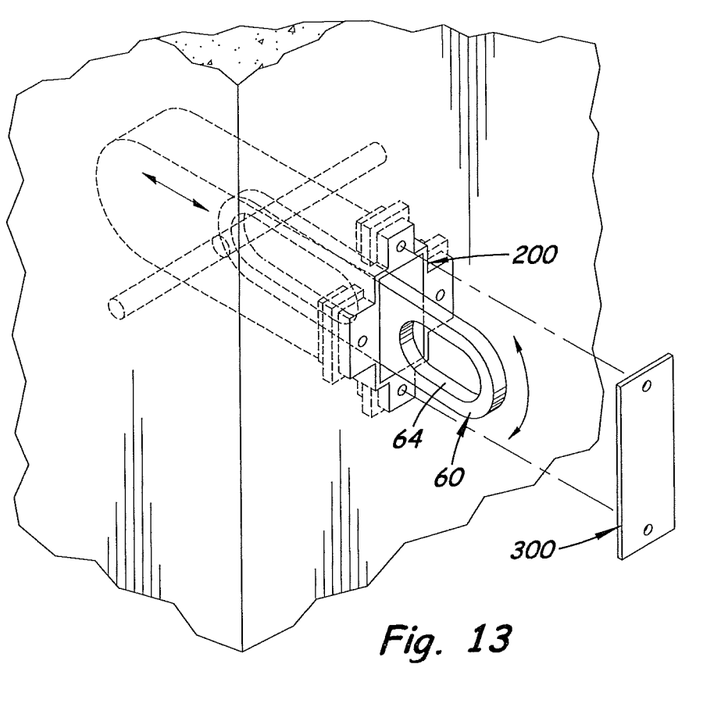
FIG. 13 is an illustration of the third embodiment of the anchor point located on a vertical column.
Figure 14:
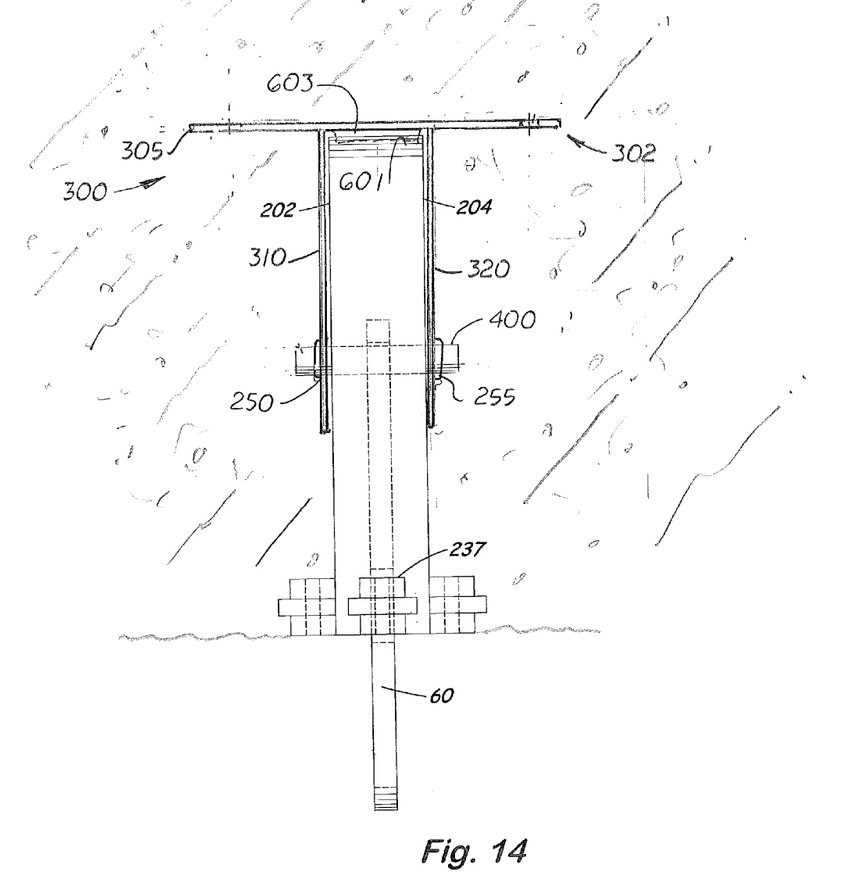
FIG. 14 is a front elevational view of another embodiment of the invention that includes a T-shaped bracket used to hold the elongated receiver box.
Figure 15:
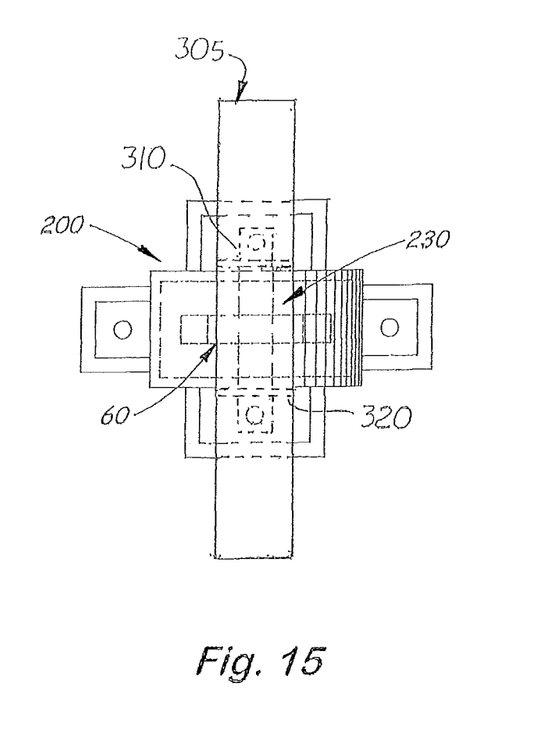
FIG. 15 is a top plan view of the anchor point shown in FIG. 14.
Figure 16:
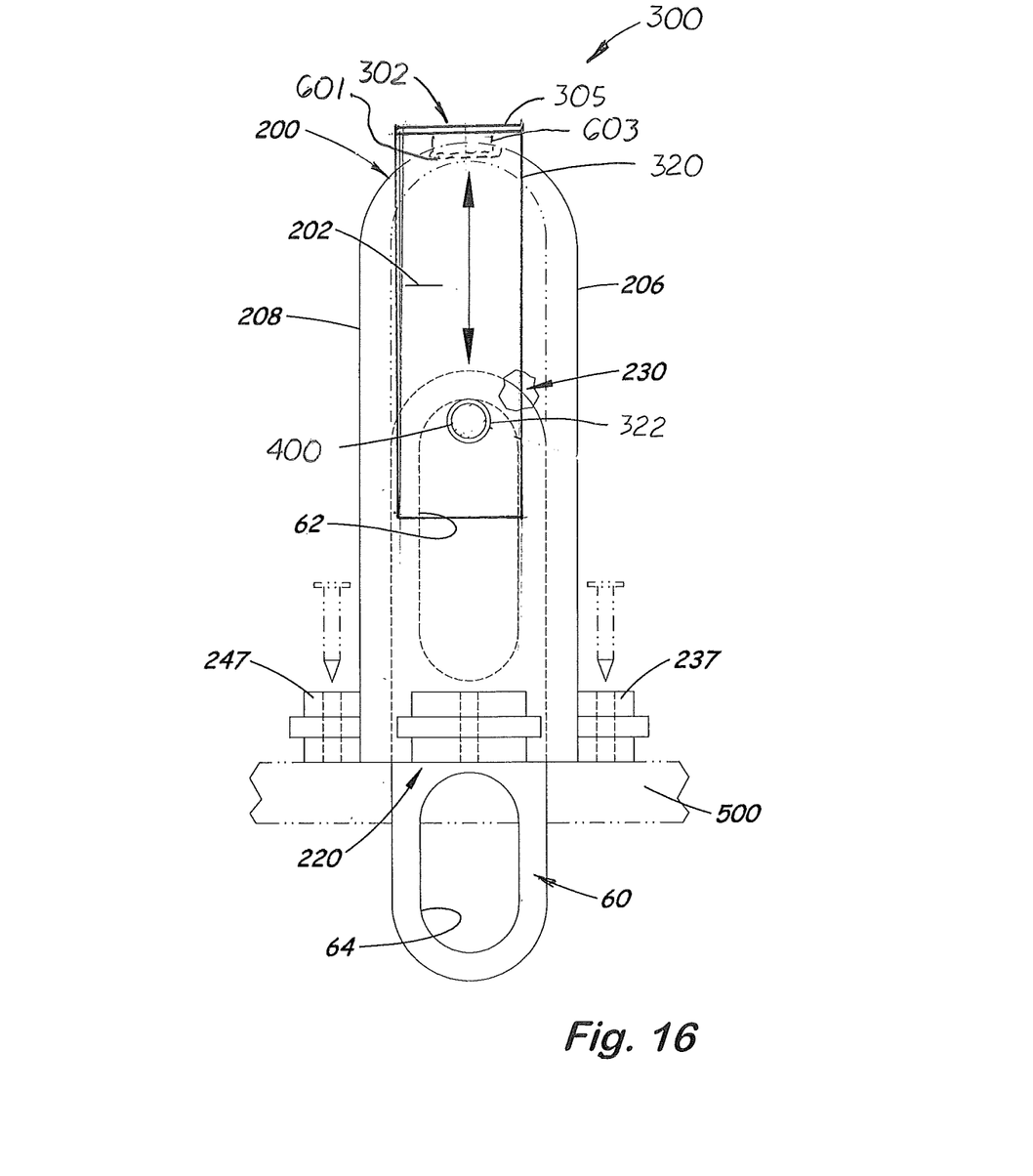
FIG. 16 is a side elevational view of the anchor point shown in FIG. 14.
Figure 17:
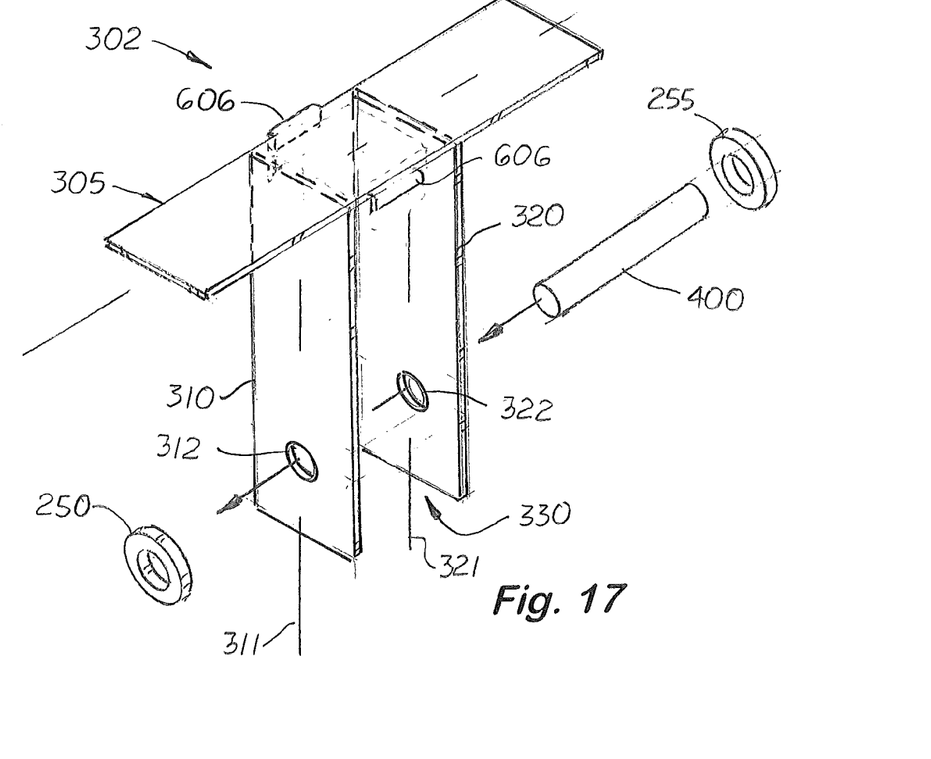
FIG. 17 is a side perspective view of the T-shaped bracket used in the embodiment of the anchor point shown in FIGS. 14-16.

FIG. 13 is an illustration showing the anchor point used with the elongated box 200 mounted on a vertical column.

FIGS. 14-18 show additional two embodiments of the anchor point 300 that include an external rigid structure that extends inward and attaches to the elongated receiver box 22 and becomes embedded in the concrete to provide addition strength. In these embodiments, the rod 50 described above is replaced by a shorter rod 400 used only to attached the connector plate 60 to the elongated receiver box 22. In the embodiment shown in FIGS. 14-17, the external rigid structure is a T-shaped bracket 302 with an elongated main flange 305 and two parallel side flanges 310, 320. The main flange 305 is rectangular shape with a longitudinal axis 30. The side flanges 310, 320 are also rectangular shaped with longitudinally axis 311, 321, respectively. During assembly, the bracket 302 is positioned on one side of the receiver box 22 with the main flange 305 oriented perpendicular to the receiver box's longitudinal axis. The two side flanges 310, 320 are substantially perpendicular to the main flange's longitudinal axis 306. The elongated receiver box 22 is inserted into the center space 330 formed between the two side flanges 310, 320. Formed on each side flange 310, 320 equal distances from the main flange 305 is a hole 312, 322, respectively. Extending between the side flanges 310, 320 and transversely through the receiver box's interior cavity 230 is a short rod 400 with its opposite ends 405, 410 that extend laterally from the side flanges 310, 320 and become covered with concrete. Optional lock rings 250, 255 may be attached to the exposed ends of the short rod 400 which hold the short rod 400 in place on the two side flanges 310, 320 and the elongated receiver box 200.

Figure 18:
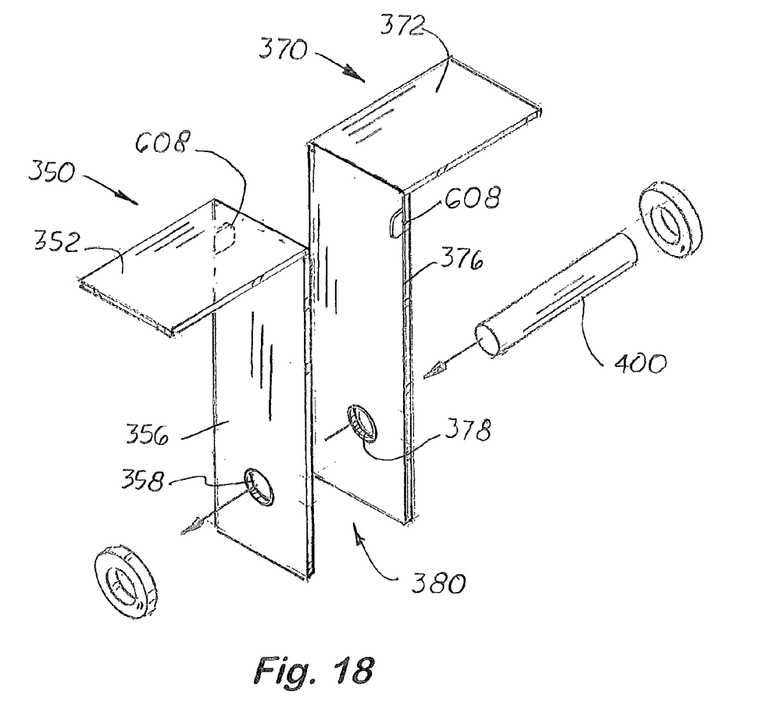
FIG. 18 is a side perspective view of the two L-shaped brackets that attached to the elongated box and become embedded into column for greater strength.

In the embodiment shown in FIG. 18, the external rigid structure comprises two L-shaped brackets 350, 370 located on opposite sides of the elongated receiver box 200. The two L-shaped brackets 350, 370 each include a shorter main flange 352, 372, respectively and a side flange 356, 376, respectively. The side flanges 356, 376 are held apart creating a center space 380 that receives an elongated receiver box 200 that is perpendicularly aligned with the main flanges 352, 372. Holes 358, 378, are formed on the side flanges 356, 376, respectively, that hold the rod 400.

During assembly, the front edge of the elongated receiver box 200 is attached to the inside surface of a front frame member used to make the concrete column, wall or ceiling. The side flanges 310, 320 on the T-shaped bracket 302 or the side flanges 356, 376 on the two L-shaped brackets 350, 370, respectively, are longitudinally aligned with the elongated receiver box 200. A short rod 400 is inserted into the holes formed on the side flanges and through the elongated receiver box 200. After assembly, the main flange 305 on the T-shaped bracket 302 or the main flanges 352, 372 formed on the L-shaped brackets 350, 370 are located deep inside the column, wall or ceiling form and become embedded in concrete.

Attached to the portion of the short rod 400 located inside the elongated box's interior cavity 230 is the elongated connector plate 60 also described above. The connector plate 60 is assembled on the short rod 400 and is configured to rotate around the short rod 400 and move longitudinally inward inside the receiver box's interior cavity 230 to a hidden position or moved outward from the interior cavity 230 partially exposing the plates' second opening 65.

The T-shaped bracket 302 and the two L-shaped brackets 350, 370 are made of 7 to 14 gauge steel. The ends of the main flange 305 and the two main flanges 352, 372, extend approximately one inch or more from the adjacent side flange.

The main flange 305 and the two main flanges 353, 372 may include optional alignment tabs or stubs 603 or 606, respectively, that capture the end or the sides of the receiver box 200 to temporarily hold the brackets 302, 350, 370 in place on the receiver box 200 inside the hollow form. Alternatively, optional recessed surfaces 601 may also be formed on the receiver box 200 that capture the stubs 603 or 606 on the main flange 305 or on the main flanges 352, 372, respectively.

During assembly, the T-shaped bracket 302 with the elongated box 200 and connector plate 60 may aligned with its main flange 305 positioned against an inner wood frame member. The opposite end of the elongated receiver box 200 is aligned with the outside finished surface of the concrete structure. Suitable nails or threaded connectors that extend through the holes 307 and attach to the wood frame member to hold the bracket 302 in place. The connector plate 60 is forced into the elongated receiver box 200. An outer wood frame member is then positioned against the end of the elongated box. Suitable nails or threaded connectors that extend through the holes formed on the elongated box and attach to the outer wood frame member. Concrete is then poured around the T-shaped bracket 302, the elongated receiver box 200 and the exposed ends of the short rod 400.

During assembly, the front edge of the elongated box is attached to the inside surface of the front frame member used to make the concrete column, wall or ceiling. The side flanges on the T-shaped brackets or the two L-shaped brackets are longitudinally aligned with the elongated box. The main flanges on the T-shaped brackets or L-shaped brackets are located deep inside the column, wall or ceiling form and become embedded in concrete.

A method for constructing a tie-off anchor point in a concrete deck is disclosed comprising the following steps;

a. constructing a form configured to form a concrete deck, said form includes a lower horizontal or vertical surface;

b. selecting a receiver box with two long side walls, two short end walls, a top wall, a lower opening, an interior cavity, and at least one flange surface;

c. attaching said receiver box on the inside surface of said form;

d. selecting a rod and extending said rod through said long side walls on said receiver box and transversely over said interior cavity, said rod including opposite ends that extend laterally from said side walls;

e. attaching a connector plate attached a portion of said rod located inside said interior cavity; and, f. attaching said receiver box over said inside surface of said form.

An alternative method for constructing a tie-off anchor point in a concrete structure is also disclosed comprising the following steps;

a. constructing a form configured to form a concrete deck, said form includes a lower surface;

b. selecting an elongated box with two long side walls, two short end walls, a top wall, a lower opening, an interior cavity, and at least one flange surface;

c. attaching said elongated box on the inside surface of said form;

d. selecting a rod and extending said rod through said long side walls on said elongated box and transversely over said interior cavity, said rod including opposite ends that extend laterally from said side walls;

e. attaching a connector plate attached a portion of said rod located inside said interior cavity; and, f. attaching said elongated box over said inside surface of said form.

A third alternative method for constructing an anchor point in a concrete structure comprising the following steps;

a. constructing a form;

b. selecting a receiver box with two long side walls, two short end walls, a top wall, a lower opening, an interior cavity, and at least one front flange surface adjacent to said lower opening;

c. selecting an external rigid structure that includes at least one main flange and two side flanges, said side flanges extend over said long sides of said receiver box and spaced apart to form a center space in which said receiver box is placed;

c. attaching said receiver box to the inside surface of said form;

d. selecting a rod and extending said rod through said side flanges and through said long side walls on said receiver box and transversely through said interior cavity formed in said receiver box, said rod including opposite ends that extend laterally from said side walls;

e. attaching a connector plate attached a portion of said rod located inside said interior cavity; and, f. positioning said external rigid structure and said receiver box inside said form and attaching said flange surface on said receiver box to said inside surface of said form.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. An anchor point for a concrete structure, comprising;
   a. an external rigid structure with at least one elongated main flange and two side flanges, said main flange includes two opposite flat surfaces and a longitudinal axis, said side flanges being parallel and extending from one flat surface on said main flange and perpendicular to said longitudinal axis, said side flanges being spaced apart forming a center space between them, each said side flange includes a coaxially aligned hole;
   b. an elongated receiver box with two long side walls, two short side walls, an end wall, a lower opening opposite said end wall, and an interior cavity, said elongated receiver box configured to fit into said center space with said long side walls located adjacent to said side flanges and extend beyond said side flanges;
   c. a rod extending transversely through said interior cavity, said rod including a center portion located inside said interior cavity and two opposite ends that extend laterally from said side flanges;
   d. an elongated connector plate attached at one end to said center portion of said rod located inside said interior cavity, said connector plate includes an oval shaped first hole configured to slide longitudinally over said rod and allow said connector plate to move between a longitudinally align position inside said elongated box to a partially extended position through said lower opening, said connector plate includes a second hole located near an end opposite said end connected to said rod, and,
   e. whereby when said elongated receiver box is attached to a frame member used to form a concrete structure, wet concrete is poured into the form and covers said external rigid structure, said elongated receiver box and said opposite ends of said rod.

2. The anchor point as recited in claim 1, wherein said external rigid structure is a T-shaped bracket that includes one elongated main flange and two parallel side flanges.

3. The anchor point as recited in claim 2, further including a stub formed on said main flange configured to engage a recessed surface formed on a surface of said elongated receiver box adjacent to said main flange when said elongated receiver box is attached to said bracket, said stub and recessed surface configured prevent said elongated receiver box from rotating when attached to said bracket.

4. The anchor point as recited in claim 2, further including at least one flange surface of said elongated box configured to extend over a wood form used to form the bottom surface of a concrete structure.

5. The anchor point as recited in claim 1, wherein said external rigid structure comprises two L-shaped brackets each with a main flange and a perpendicularly aligned side flange, said L-shaped brackets being spaced apart so that said perpendicularly aligned side flanges are parallel with a center space formed between them that receives said receiver box.

6. The anchor point as recited in claim 5, further including tabs formed on said L-shaped brackets that keep said side flanges on said L-shaped brackets aligned with said side walls on said elongated receiver box.

7. The anchor point as recited in claim 1, further including at least one flange surface of said elongated box configured to extend over a wood form used to form the bottom surface of a concrete structure.

8. The anchor point as recited in claim 1, wherein said second hole formed on said connector plate is oval shaped.

9. The anchor point as recited in claim 1, further including tabs formed on said rigid structure that keep said side flanges aligned with said side walls on said elongated receiver box.

10. A method for constructing an anchor point in a concrete structure comprising the following steps;
   a. constructing a form;
   b. selecting an elongated receiver box with two long side walls, two short end walls, a top wall, a lower opening, an interior cavity, and at least one front flange surface adjacent to said lower opening;
   c. selecting an external rigid structure with;
      a T-shaped bracket with at least one elongated main flange and two side flanges; or
      two L-shaped brackets each with a main flange and a perpendicular aligned side flange, said side flanges extend over said long sides of said elongated receiver box and sufficiently spaced apart to form a center space in which said elongated receiver box is placed;
   d. attaching said elongated receiver box to the inside surface of said form;
   e. inserting a connector plate with an oval shaped first hole and a second hole formed on opposite ends, said connector plate configured to slide longitudinally inside and fit entirely inside said interior cavity, said connector plate inserted a sufficient distance into said interior cavity so that said first hole on said connector plate is aligned with side holes formed on said elongated receiver box;
   f. selecting a rod and extending said rod through said side flanges and through said long side walls on said elongated receiver box and transversely through said interior cavity formed in said elongated receiver box, said rod including opposite ends that extend laterally from said side walls;
   g. positioning said external rigid structure and said elongated receiver box inside said form and attaching said flange surface on said elongated receiver box to said inside surface of said form; and,
   h. pouring concrete into said form and covering said external structure, said elongated receiver box and the opposite ends of said rod.

* * * * *